United States Patent [19]
Fukuma et al.

[11] Patent Number: 5,268,737
[45] Date of Patent: Dec. 7, 1993

[54] METHOD AND APPARATUS FOR CALIBRATING A SPECTROPHOTOMETER

[75] Inventors: Toshiaki Fukuma; Tatsumi Sato; Hidehisa Nishigaki, all of Kyoto, Japan

[73] Assignee: Shimidzu Corporation of 1, Kyoto, Japan

[21] Appl. No.: 469,006

[22] Filed: Jan. 23, 1990

[30] Foreign Application Priority Data

Jan. 28, 1989 [JP] Japan ............................ 1-19251
Jan. 31, 1989 [JP] Japan ............................ 1-22155

[51] Int. Cl.$^5$ ............................................ G01J 3/18
[52] U.S. Cl. ................................. 356/328; 356/334
[58] Field of Search ............... 356/319, 320, 323–326, 356/328, 331–332, 334; 250/226; 364/498

[56] References Cited

U.S. PATENT DOCUMENTS 4,643,572 2/1987 Sonobe et al. .................. 356/334
4,710,024 12/1987 Fukuma ........................... 356/328

FOREIGN PATENT DOCUMENTS 207498 7/1986 European Pat. Off. .
277720 1/1988 European Pat. Off. .
2754444 12/1977 Fed. Rep. of Germany .
57-153226 9/1982 Japan .
2071313 3/1981 United Kingdom .

*Primary Examiner*—Vincent P. McGraw
*Assistant Examiner*—K. P. Hantis
*Attorney, Agent, or Firm*—Armstrong, Westerman, Hattori, McLeland & Naughton

[57] ABSTRACT

A spectrophotometer of the type using a pulse motor to rotate a diffraction grating through a speed reducing mechanism has a capability of constructing a conversion table according to a program, by which table a rotation amount of the motor is converted to a corresponding wavelength of output light from a monochromator. The spectrophotometer is capable of designating a calibration mode in which an emission peak at a known wavelength of light from a light source is detected, a coefficient in a conversion equation is determined on the basis of the known wavelength of the emission peak and a rotation amount of the motor at a time when the emission peak is detected, and the determined coefficient is used to construct the conversion table which is then stored in a nonvolatile memory. In an analysis mode, a rotation amount of the motor is converted to a corresponding wavelength in accordance with the conversion table in the nonvolatile memory.

10 Claims, 1 Drawing Sheet

METHOD AND APPARATUS FOR CALIBRATING A SPECTROPHOTOMETER

BACKGROUND OF THE INVENTION

The present invention relates to a spectrophotometer, and, more particularly, to a spectrophotometer of a type that uses a motor to rotate a dispersive element for scanning over a range of wavelengths or setting a certain wavelength.

A sine bar has previously been used as a mechanism for performing scanning over a range of wavelengths on spectrophotometers equipped with a diffraction grating. In this mechanism, a nut is moved by means of a feed screw to push the sine bar projecting from the axis of the grating. Although the amount of rotation of the feed screw has a linear relationship with the wavelength, the use of a feed screw prevents fast feeding over a wavelength range. The recent advances in computer technology have made it relatively easy to convert the amount of rotation of a pulse motor quickly to a value of a desired function. Under this circumstance, the advantage of linear relationship between the amount of rotation of a feed screw and wavelength has gradually lost its appeal, and the difficulty involved in fast feeding over a wavelength range has become a major concern to the users of spectrophotometers adopting the sine bar mechanism. On the other hand, spectrophotometers of a type that allows a dispersive element to be directly rotated via a speed reducing mechanism have gained increasing popularity for several reasons including simple construction and low cost.

In this type of spectrophotometer which causes the dispersive element to be directly rotated via a speed reducing mechanism, the amount of rotation of the motor does not have a linear relationship with the wavelength even if a grating is used as the dispersive element. If a grating is used as the dispersive element, the relationship between the angle of rotation, $\theta$, of the grating from a reference position and wavelength $\lambda$ of output light is expressed by:

$$\lambda = \frac{2d}{n} \cos\phi \sin\theta \qquad (1)$$

where d is the grating constant of the grating and n is the order of diffraction. As shown in FIG. 4, the angle $\phi$ is one half the angle formed between incident light on the grating G and diffracted light, that is, one half the angle subtended by the entrance and exit slits in the monochromator with respect to the center of the grating. Given equation (1) which describes the relationship between the angle of rotation of the grating and wavelength, the spectrophotometer of the type under consideration (which allows the dispersive element to be directly rotated via a speed reducing mechanism) converts the amount of rotation, x, of the driving motor to a corresponding wavelength using a ROM stored with a table that correlates the amount of x to wavelength by the following equation:

$$\lambda = K \cdot \sin px \ (\theta = px). \qquad (2)$$

In equation (2), p is a constant determined by the speed reducing mechanism, but K includes not only the grating constant of the grating [see equation (1)] but also quantities associated with the positions of optical elements such as the entrance and exit slits in the monochromator. These quantities contain errors that will occur during the working and assembly of monochromator components and hence will differ slightly among individual units of spectrophotometer even if they are fabricated of the same design. Furthermore, it is difficult from a practical viewpoint to equip individual units of the device with a ROM stored with a table that was constructed by actual measurements of K in accordance with equation (2). Instead, the following procedure is usually taken: a ROM is preliminarily provided that is stored with a plurality of tables constructed for several values of K according to equation (2), and is mounted on each of the fabricated spectrophotometers; prior to shipment from the factory, a calibration test is conducted for each unit of the device to select an optimum table from those stored in the ROM; and when using a particular unit, the amount of rotation of the drive motor is converted to a corresponding wavelength using the selected table.

As described above, the spectrophotometer of the type that allows a dispersive element to be directly rotated with a motor via a speed reducing mechanism uses a conversion table to convert the amount of motor rotation to a corresponding value of wavelength. Ideally, each unit of the device must be equipped with a different conversion table due to the limited precision of working of monochromator components but, in practice, an optimum table is selected from among several prepared tables by a calibration test and used for subsequent spectrophotometric measurements. For this purpose, it is desirable to prepare the largest possible number of tables with slightly different contents. However, the number of tables that can be prepared is limited by the capacity of ROM and it sometimes occurs that an optimum table is not available for a certain spectrophotometer and that the value intermediate between two values in two different tables has to be used as the best one. With another device, the relationship between the amount of motor rotation and wavelength value may not fit any of the prepared tables. However, there has been no simple prior art method that is capable of dealing with these problems.

SUMMARY OF THE INVENTION

An object, therefore, of the present invention is to provide a spectrophotometer that is capable of dealing with the aforementioned problems without preliminarily providing a large number of conversion tables.

A spectrophotometer according to a first aspect of the present invention has a capability of constructing a conversion table by which the amount of rotation of a motor for driving a dispersive element is converted to a corresponding value of wavelength of output light from a monochromator. This spectrophotometer is capable of designating a calibration mode in which an emission peak at a known wavelength of light from a light source is detected, and a coefficient for use in the construction of a conversion table is determined both from the amount of rotation of the drive motor at a time when the emission peak is detected and from the known wavelength of said emission peak, and the thus determined coefficient is used to construct a conversion table which is then stored in a nonvolatile memory in a control unit. In an analysis mode, the amount of rotation of the drive motor is converted to a corresponding value of wavelength according to the conversion table in the memory.

The relationship between the angle of rotation $\phi$ of a diffraction grating and wavelength $\lambda$ is given by equation (2), wherein K contains the grating constant and working variations in the positions of optical elements such as slits. The value of K varies from one device unit to another. The spectrophotometer according to the first aspect of the present invention has a capability of constructing a table that converts the amount of rotation, x, of the drive motor to a corresponding wavelength $\lambda$ according to equation (2). Hence, by determining the values of K through actual measurements in the calibration mode, a table of conversion from x to $\lambda$ can be constructed. Constructing such a table on each occasion of actual analysis requires time-consuming calculations but, in the present invention, a preliminarily constructed table is stored in the nonvolatile memory, so using this table the amount of motor rotation can be immediately converted to the wavelength as required in actual analysis.

A spectrophotometer according to a second aspect of the present invention has a single table of conversion from x to $\lambda$ stored in a ROM, and a correction coefficient by which a value extracted from this conversion table is multiplied in order to obtain the correct value of wavelength corresponding to the amount of motor rotation is determined in a calibration test, and stored in a nonvolatile memory in a control unit. When using this spectrophotometer, the data in the table in the ROM is corrected by the coefficient stored in the nonvolatile memory so as to construct a conversion table that matches said spectrophotometer and the obtained table is stored in a RAM for subsequent use in wavelength determination.

Stated more specifically, a table of conversion from x to $\lambda$ is preliminarily provided in a ROM according to equation (2) using a predetermined value of K. In the calibration test, the wavelength determined using said table is compared with a known wavelength to determine the correction coefficient $\alpha$ by which the wavelength obtained from the conversion table in the ROM is to be multiplied. The correction coefficient $\alpha$ is stored in the nonvolatile memory in the control unit and, in an actual measurement, the values of wavelength corresponding to those of x, which have been extracted from the table in ROM, are multiplied by and stored in a RAM to generate the correct conversion table in the RAM which is optimum for the spectrophotometer of interest. In subsequent operations, this table in the RAM is used to convert the amount of motor rotation to the correct value of corresponding wavelength.

DETAILED DESCRIPTION OF THE PREFERRED EMBODIMENTS

Figure 1:
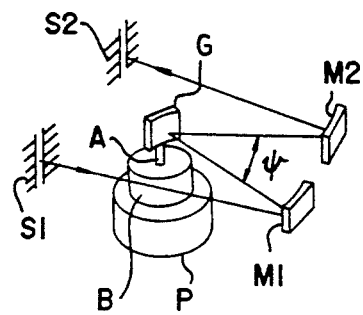
FIG. 1 is a perspective view of the monochromator used in a spectrophotometer according to the present invention.
Figure 2:
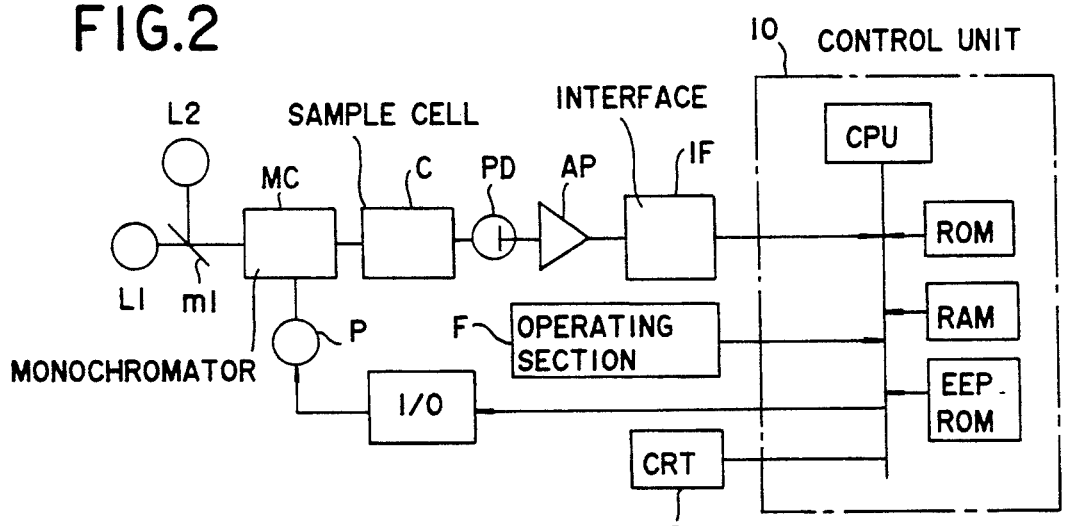
FIG. 2 is a block diagram showing the overall construction of said spectrophotometer.
Figure 4:
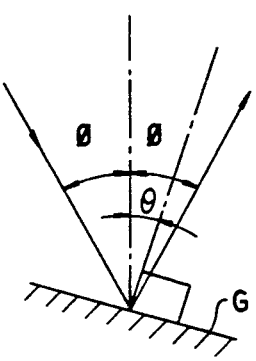
FIG. 4 is a diagram showing the relationship between incident and exit angles of light on a diffraction grating and a rotation angle of the diffraction grating.

FIG. 1 shows the monochromator used in a spectrophotometer of the present invention, and FIG. 2 shows the overall construction of this spectrophotometer. Shown by G in FIG. 1 is a planar diffraction grating, and A is the axis of rotation of the grating G which serves as the output shaft of a speed reducing mechanism B. Shown by P is a pulse motor the rotation of which is transmitted to the output shaft A via the mechanism B. Shown by S1 is an entrance slit in the monochromator; S2 is an exit slit; M1 is a collimator mirror which collimates the incident light from S1 to be launched onto the grating G; and M2 is a camera mirror which condenses the diffracted collimated light at a point on the exit slit S2. One half the angle $\Psi$ shown in FIG. 1 is equal to the angle $\phi$ in equation (1). The orientation of the grating G at which the line normal to the grating G at its center coincides with the line dividing the angle $\Psi$ into two equal parts is the reference position for G. The angle of rotation $\phi$ of the grating is measured from this reference position.

The monochromator shown in FIG. 1 is indicated by MC in FIG. 2. Light sources L1 and L2 are built in the spectrophotometer; L1 is a deuterium lamp for the shorter wavelength range and L2 is a tungsten lamp for the longer wavelength range. A switch mirror m1 is moved in such a way that if it is inserted into the optical path of light from L1, light from L2 is launched into the monochromator MC and that if it is removed from said optical path, light from L1 is launched into MC. Shown by C is a sample cell through which the light emerging from MC will pass. A sample is set within the optical path of light issuing from MC. Shown by PD is a photodetector receiving the light from MC that has passed through the sample cell C. The output signal of the detector PD is amplified by an amplifier AP and fed into a control unit 10 through an interface IF. The control unit 10 comprises a central processing unit CPU, a ROM into which an operational program and a conversion table or a program for constructing a conversion table, etc. have been written, a nonvolatile memory EEPROM, and a RAM. The control unit 10 controls the overall operation of the system and processes the photometric data that has been supplied via IF. Shown by D is a display such as a CRT display for indicating the results of analysis and any other necessary information. Shown by F is an operating section by means of which the operator enters various kinds of data or operational commands into the control unit 10.

The first embodiment of the present invention is described hereinafter.

Figure 3:
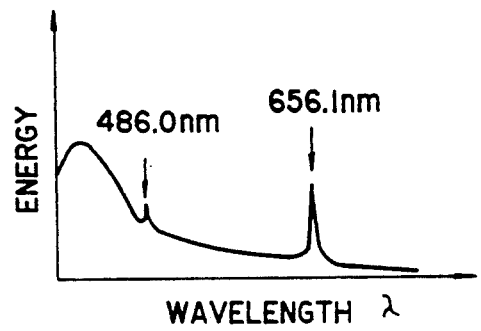
FIG. 3 is a graph showing the spectral energy characteristic of a deuterium lamp to be used in a calibration test.

The ROM in the control unit 10 has in store a program for constructing a conversion table according to equation (2) which expresses the relationship between the wavelength $\lambda$ and the amount of rotation, x, of the motor P. A calibration test on the spectrophotometer is performed by the following procedure using the internal light source L1. L1 is a deuterium lamp having a spectral characteristic which, as shown in FIG. 3, has a sharp peak at 486.0 nm and 656.1 nm. Calibration is performed with these peaks. When the grating G is rotated in the direction toward zero wavelength, diffracted light of zeroth order is detected at a wavelength of zero. Search is conducted for the peak of the output of the photodetector PD at about zero wavelength. When the peak center is detected, the orientation of the diffraction grating G corresponding to the detected peak center is used as the reference position of the grating, and the amount of rotation of the pulse motor P from that reference position is substituted as x into equation (2). This amount x is obtained by counting the number of drive pulses fed to the pulse motor P starting at the time when the grating G is on its reference position. The drive pulses are supplied and counted by the CPU in the control unit 10. When the amount of rotation of the pulse motor P is counted with the grating G being driven from its reference position toward the longer wavelength region, emission peaks at 486.0 nm and 656.1 nm in the spectrum of light from L1 are successively launched into the photodetector PD. Search is then conducted for the emission peaks at 486.0 nm and 656.1 nm. When the peak center is detected, the amount of rotation, x, of the pulse motor P corresponding to the detected peak center is made associated with the wavelength of 486.0 nm or 656.1 nm. The value of K in equation (2) can be determined on the basis of the above-obtained values of x and the wavelengths of those two emission peaks preliminarily stored in the ROM. The value of K is determined as the average of the values calculated for the two emission peaks. Thereafter, a conversion table is constructed in accordance with the program in the ROM and written into the nonvolatile memory EEPROM.

The program in the ROM for constructing a conversion table calculates wavelength $\lambda$ for each value of x determined upon successive steps of the rotation of the pulse motor P. As is clear from equation (2), the calculation of $\lambda$ involves computing the sine of px. In order to shorten the computing time, the values of sinpx are preliminarily calculated for a certain number of x values and stored in the ROM, and values of sinpx for intermediate values of x are computed by a suitable method of interpolation. The thus computed sinpx is multiplied by the value of K and the result of this multiplication is written into the nonvolatile memory EEPROM together with the value of x for each step of motor rotation.

When conducting an analysis in practice, the value of wavelength corresponding to x, i.e., the amount of rotation of the pulse motor P from the reference position of the grating G, may be extracted from the conversion table in the nonvolatile memory EEPROM.

In the first embodiment described above, the calibration test is conducted using only two emission peaks and hence the value of K to be substituted into equation (2) is calculated by averaging the values of K determined for these two emission peaks. Theoretically, only one emission peak will suffice for calibration purposes if a diffraction gating is used as the dispersive element. In practice, however, the value of K in equation (2) is also a function of wavelength because it is influenced by such factors as variations in grating constant depending on a site on the grating. The calibration can be performed in a very precise manner if the values of K are determined on the basis of several emission peaks and processed by the method of least squares or otherwise to obtain a function K(x) and a conversion table is constructed in the form of K(x)sinpx.

The second embodiment of the present invention is described hereinafter with reference to the case where a calibration test is conducted using only one emission peak.

The ROM in the control unit 10 has in store a conversion table according to equation (2) expressing the relationship between wavelength $\lambda$ and the amount of rotation, x, of the motor P, which table is associated with the design of the spectrophotometer. A calibration test on the spectrophotometer is performed by the following procedure using the internal light source L1. L1 is a deuterium lamp having a wavelength characteristic which, as shown in FIG. 3, has a sharp peak at 656.1 nm. Calibration is performed with this peak. When the grating G is rotated in the direction toward zero wavelength, diffracted light of zeroth order is detected at a wavelength of zero. Search is then conducted for the peak of the output of the photodetector PD at about zero wavelength. When the peak center is detected, the orientation of the diffraction grating G corresponding to the detected peak center is used as the reference position of the grating G, and the amount of rotation of the pulse motor P from that reference position is substituted as x into equation (2). This amount of x is obtained by counting the number of drive pulses fed to the pulse motor P starting at the time when the grating G is on its reference position. The drive pulses are supplied and counted by the CPU in the control unit 10. When the amount of rotation of the pulse motor P is counted with the grating G being driven from its reference position toward the longer wavelength range, emission peak at 656.1 nm in the spectrum of light from L1 is launched into the photodetector PD. Search is then conducted for the emission peak at 656.1 nm. When the peak center is detected, the amount of rotation, x, of the pulse motor P corresponding to the detected peak center is made associated with the wavelength of 656.1 nm. On the other hand, if a value of wavelength $\lambda'$ is determined from said value of x in the manner as explained above, (in which the wavelength $\lambda'$ is obtained from x according to the conversion table stored in the ROM, the obtained value of $\lambda'$ is usually different from 656.1 nm since the value of $\lambda'$ is based upon the experimentally obtained value of x which is found by driving the motor until an actual desired emission peak is found. Thus, the correct value of wavelength on the spectrophotometer under consideration can be obtained by multiplying the thus obtained wavelength $\lambda'$ by the correction coefficient, $\alpha = 656.1/\lambda'$. This correction coefficient $\alpha$ is written into the nonvolatile memory EEPROM to conclude the steps of the calibration test.

The operations involved in the practical use of the spectrophotometer according to the second embodiment of the present invention are described below. First, values of $\lambda$ corresponding to those of x are read from the conversion table in the ROM. These values are then multiplied by the correction coefficient $\alpha$ stored in the nonvolatile memory EEPROM and the products are written into the RAM in such a way that they are correlated to the values of x. As a result, a table of conversion that expresses the relationship between x (the amount of rotation of the pulse motor P) and $\lambda$ (wavelength), which is a characteristic of the specific spectrophotometer under consideration, is formed in the RAM. In actual measurements, this conversion table is used to determine the wavelength from the amount of rotation of the pulse motor P.

In the second embodiment described above, the calibration test is conducted using only one emission peak. If desired, more than one emission peak may be used in the calibration test to determine a correction coefficient for each wavelength region. In the second embodiment, the conversion table associated with the design of the spectrophotometer is written into the ROM and the data in it is multiplied by the correction coefficient when the spectrophotometer is actually used. Entirely the same result will be obtained if a table of conversion from px to sinpx is stored in the ROM and if the values of K in equation (2) as determined by actual measurements in a calibration test are stored in the nonvolatile memory EEPROM.

In the two embodiments described above, emission peaks in the spectrum of light from an internal light source in the spectrophotometer are used in the calibration test and this offers the advantage that not only the manufacturer but also the user of the device is capable of performing the calibration as he finds it necessary. It should, however, be noted that the calibration test can also be conducted using an external light source.

In the embodiments described above, the reference position of the diffraction grating is detected by sensing the peak center of diffracted light of zeroth order. Alternatively, a pin on the rotating axis of the grating may be detected at a specified position by either photoelectric or mechanical means, with the grating being adapted to reach the reference position when this pin is detected.

According to the present invention, a suitable table of conversion from x (the amount of rotation of the dispersive element) to λ (wavelength) can be used for each spectrophotometer in spite of working errors that may exist in individual devices. The spectrophotometer of the present invention is capable of very precise measurements without incorporating ROMs having an especially large capacity.

What is claimed is:

1. A method for calibrating and using a spectrophotometer, the spectrophotometer having a light source and a pulse motor which can rotate a dispersive element through a speed reducing mechanism, the improvement comprising the steps of:
   providing a control means for controlling rotation of said dispersive element, said control means being operable in a calibration mode and an analysis mode; said control means having a central processing unit, a non-volatile memory, and a memory means having a conversion equation for converting a rotation amount of said motor to a wavelength of output light from said light source;
   performing calibration in said calibration mode, including
      using said control means performing a search operation to detect two coefficient values which are respectively determined on the basis of known wavelengths of two emission peaks of light from the light source and respective rotation amount values of said motor at a time when each said emission peak is detected in a search operation;
      using said control means to determine a coefficient of said conversion equation for converting a rotation amount of said motor to a wavelength of output light from said light source as an average of said two coefficient values and
      producing a conversion table using said coefficient determined by said control means with said conversion equation;
      storing said conversion table in said nonvolatile memory; and
   in said analysis mode, using said control means to convert the rotation amount of said motor to said wavelength of output light from said light source using said conversion table stored in said nonvolatile memory.

2. The method according to claim 1, wherein said conversion table is constructed in accordance with a program preliminarily written into a ROM, said program including said conversion equation.

3. The method according to claim 1, wherein said conversion equation is:

$$\lambda = K \bullet sinpx$$

where λ represents said wavelength of output light, K, said coefficient, p, a constant depending on said speed reducing mechanism, and x, said rotation amount of said motor.

4. The method according to claim 1, wherein said coefficient is determined as a function of said rotation amount of said motor on the basis of known wavelengths of a plurality of emission peaks and corresponding rotation amount values of said motor.

5. A method for calibrating and using a spectrophotometer, the spectrophotometer having a light source and a pulse motor which can rotate a dispersive element through a speed reducing mechanism, the improvement comprising the steps of:
   providing a control means for controlling rotation of said dispersive element, said control means being operable in a calibration mode and an analysis mode; said control means having a random-access memory, a read-only memory, a central processing unit, a non-volatile memory, and a memory means having a conversion equation for converting a rotation amount of said motor to a wavelength of output light from said light source;
   storing a first conversion table, for converting a rotation amount of said motor to a wavelength of output light from said light source, into said read-only memory;
   performing calibration in said calibration mode, including
      using said control means performing a search operation to detect two coefficient values which are respectively determined on the basis of known wavelengths of two emission peaks of light from the light source and respective rotation amount values of said motor at a time when each said emission peak is detected in a search operation;
      using said control means to determine a correction coefficient by which a wavelength extracted from said first conversion table is to be multiplied to obtain a corrected wavelength on the basis of a known wavelength of at least one emission peak of light from the light source and a rotation amount value of said motor at a time when said emission peak is detected in a search operation, and
      storing the correction coefficient in said nonvolatile memory; and
   in said analysis mode, using said control means to construct a second conversion table on the basis of said first conversion table and said correction coefficient stored in said nonvolatile memory, and storing said second conversion table in said random-access memory, and using said control means to convert said rotation amount of said motor to the corrected wavelength by use of said second conversion table in said random-access memory 6. The method according to claim 5, wherein said first and second conversion tables are in accordance with a conversion equation of:

$$\lambda = K \bullet sinpx$$

where λ represents said wavelength of output light, K, a coefficient, p, a constant depending on said speed reducing mechanism, and x, said rotation amount of said motor.

7. The method according to claim 5, wherein said first conversion table is a one associated with the design of said spectrophotometer.

8. The method according to claim 5, wherein a plurality of correction coefficients are determined in association with respective emission peaks at respective different wavelengths, stored in said nonvolatile memory, and used in constructing said second conversion table which has a plurality of stored values corresponding to said respective different wavelengths.

9. A spectrophotometer, comprising:
a dispersive element;
a light source;
a pulse motor for rotating said dispersive element;
a control means for controlling rotation of said dispersive element, said control means being operable in a calibration mode and an analysis mode; said control means having a central processing unit, a non-volatile memory, and a memory means having a conversion equation for converting a rotation amount of said motor to a wavelength of output light from said light source;
in said calibration mode, said control means performing a search operation to detect two coefficient values which are respectively determined on the basis of known wavelengths of two emission peaks of light from the light source and respective rotation amount values of said motor at a time when each said emission peak is detected in a search operation; said control means determining a coefficient of said conversion equation as an average of said two coefficient values; and a conversion table being determined by said control means with said conversion equation and stored in said nonvolatile memory; and
in said analysis mode, said control means converting the rotation amount of said motor to said wavelength of output light from said light source by using said conversion table stored in said nonvolatile memory.

10. A spectrophotometer, comprising:
a dispersive element;
a light source;
a pulse motor for rotating said dispersive element;
a control means for controlling rotation of said dispersive element, said control means being operable in a calibration mode and an analysis mode; said control means having a random-access memory, a read-only memory, a central processing unit, a nonvolatile memory, and a memory means having a conversion equation for converting a rotation amount of said motor to a wavelength of output light from said light source;
said read-only memory containing a stored first conversion table for converting a rotation amount of said motor to a wavelength of output light from said light source;
in said calibration mode, said control means performing a search operation to detect two coefficient values which are respectively determined on the basis of known wavelengths of two emission peaks of light from the light source and respective rotation amount values of said motor at a time when each said emission peak is detected in a search operation; said control means determining a correction coefficient by which a wavelength extracted from said first conversion table is to be multiplied to obtain a corrected wavelength on the basis of a known wavelength of at least one emission peak of light from the light source and a rotation amount value of said motor at a time when said emission peak is detected in a search operation, and the correction coefficient being stored in said nonvolatile memory; and
in said analysis mode, said control means constructing a second conversion table on the basis of said first conversion table and said correction coefficient stored in said nonvolatile memory, and said second conversion table being stored in said random-access memory, and said control means converting said rotation amount of said motor to the corrected wavelength by use of said second conversion table in said random-access memory.

* * * * *